Jan. 2, 1968  W. J. DE GAIN  3,361,881
FLUID POWER CONTROL SYSTEM AND COMPONENTS
Filed Dec. 9, 1965  4 Sheets-Sheet 1
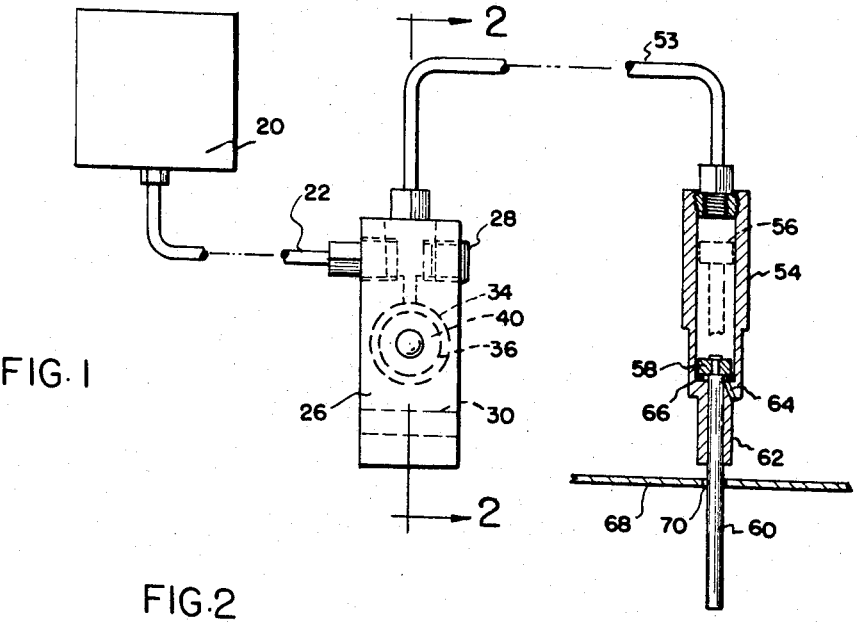
FIG. 1
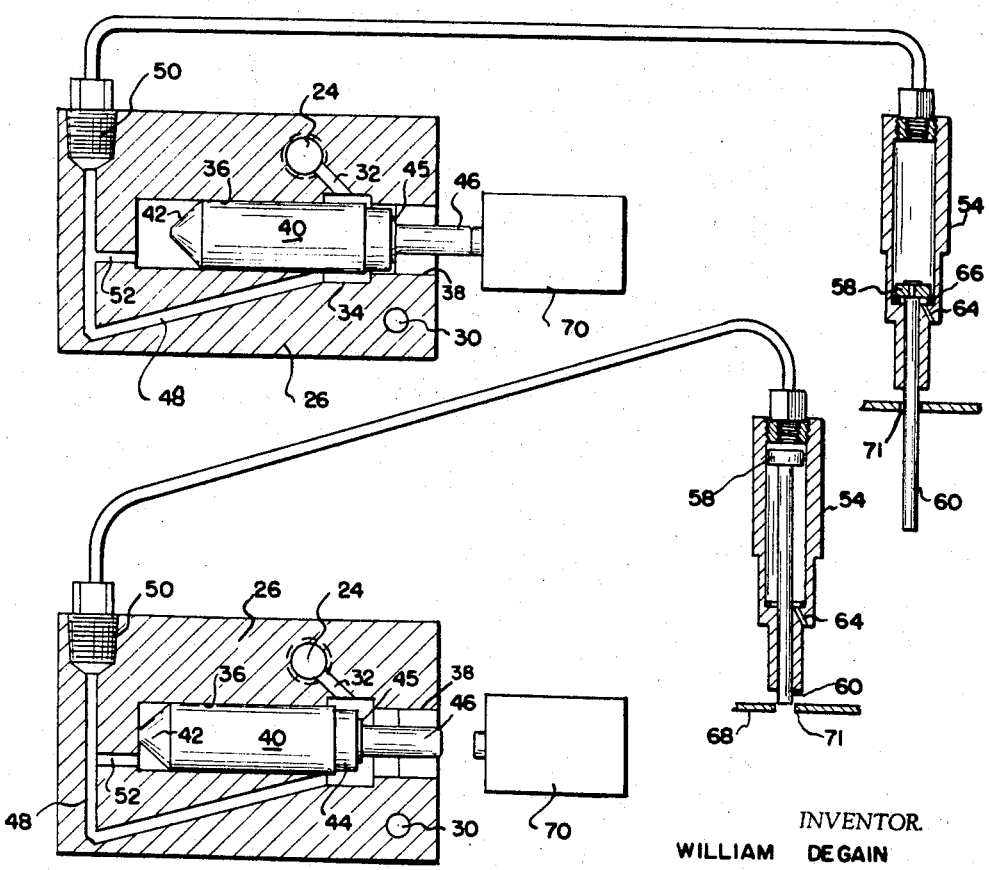
FIG. 2
FIG. 3
INVENTOR.
WILLIAM DE GAIN
BY
ATTORNEY

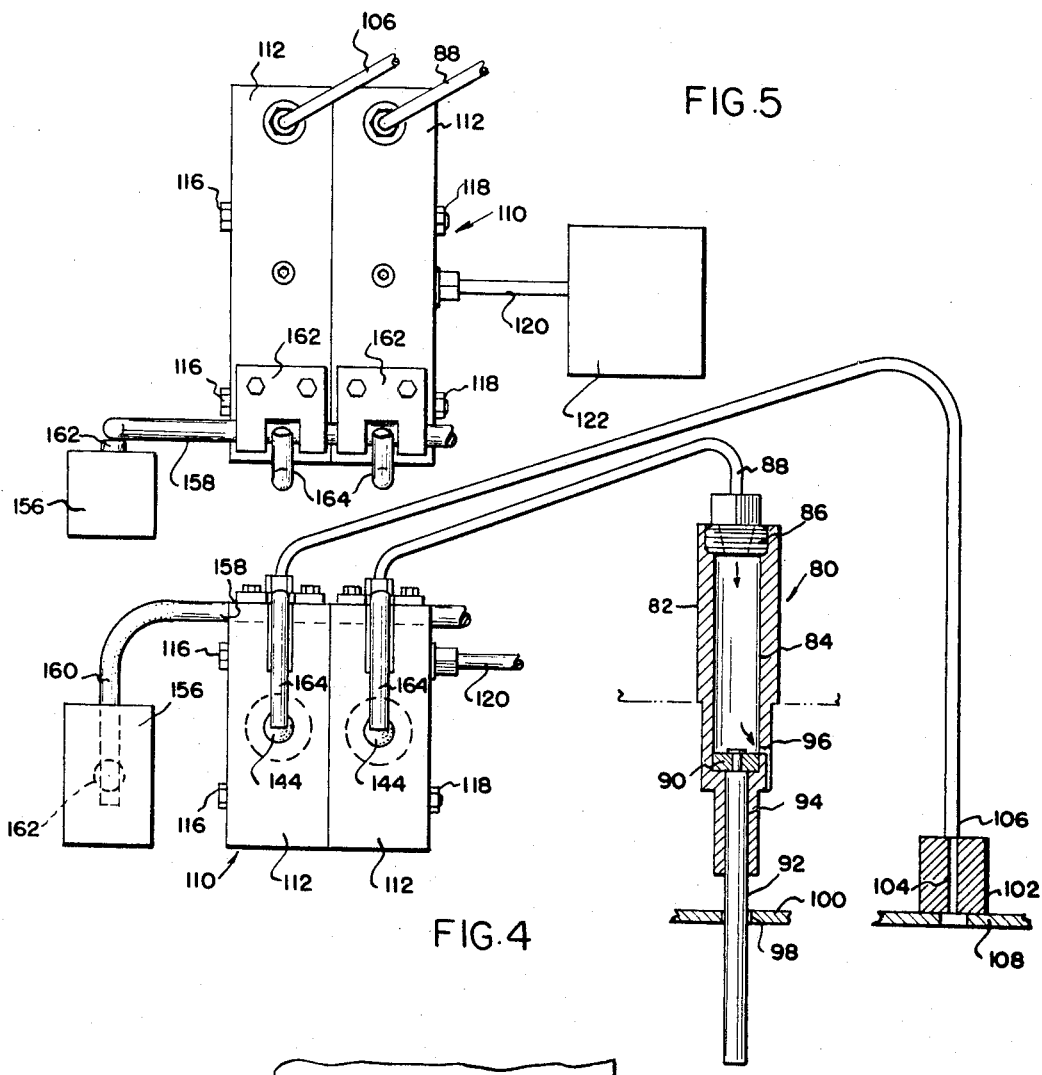
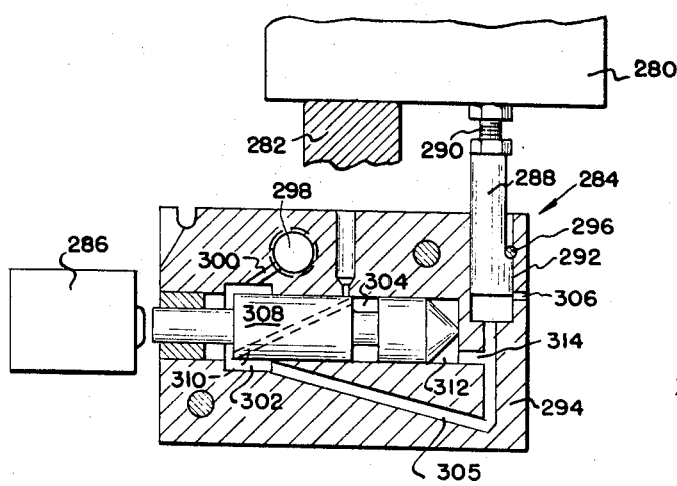
FIG. 5
FIG. 4
FIG. 11
INVENTOR.
WILLIAM DE GAIN
BY
ATTORNEY

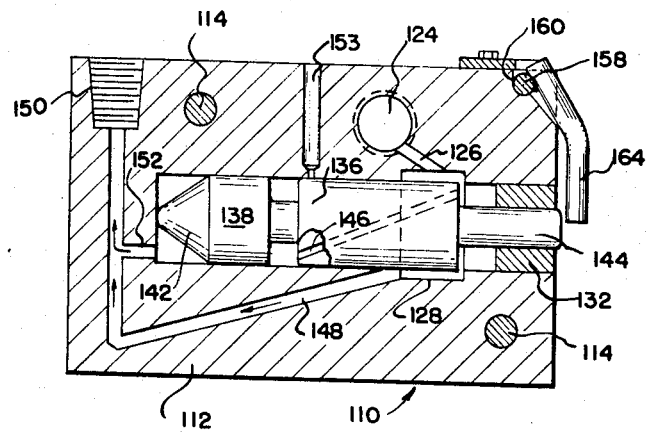
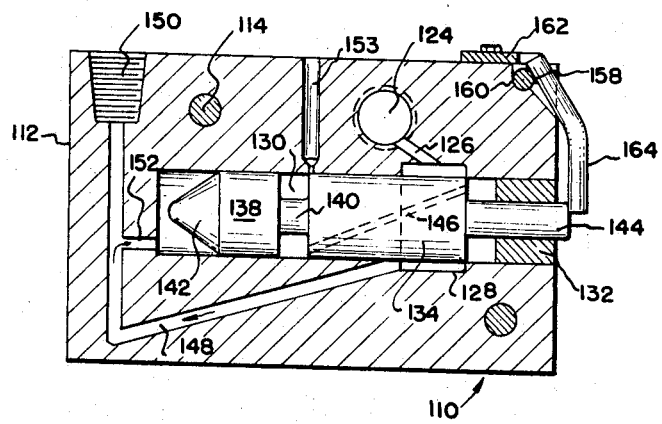
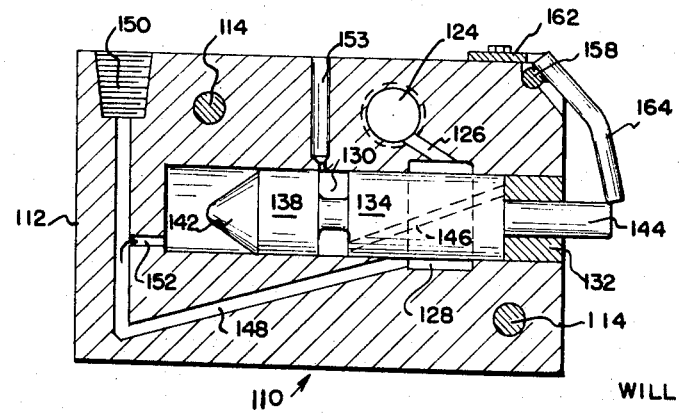

Jan. 2, 1968   W. J. DE GAIN   3,361,881
FLUID POWER CONTROL SYSTEM AND COMPONENTS
Filed Dec. 9, 1965   4 Sheets-Sheet 4
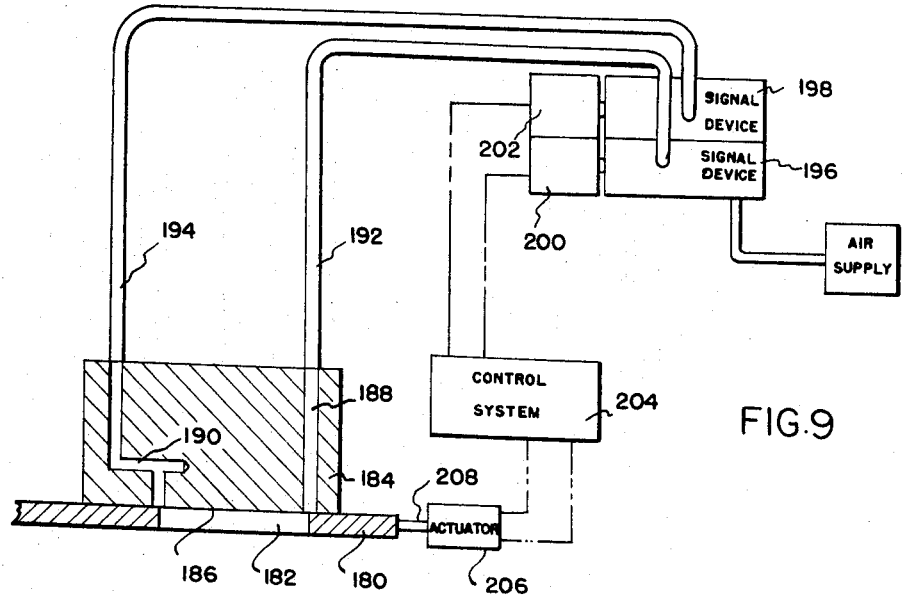
FIG. 9
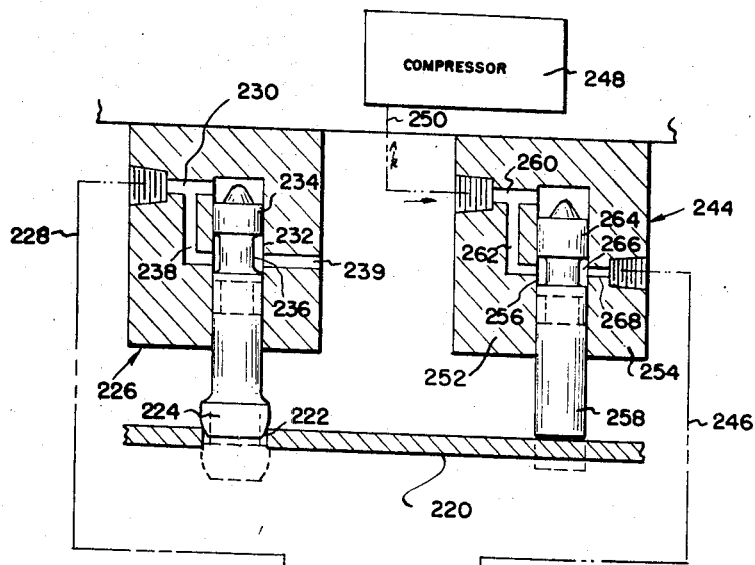
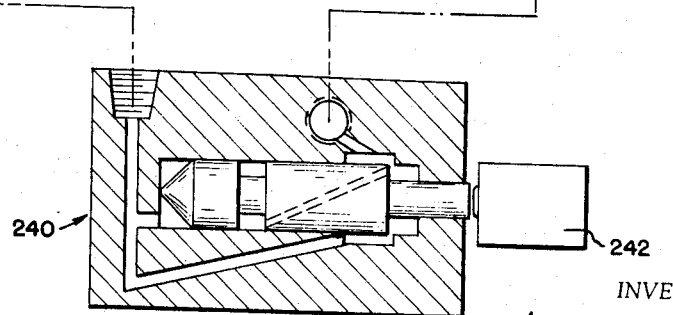
FIG. 10
INVENTOR.
WILLIAM DE GAIN
BY
ATTORNEY

United States Patent Office 3,361,881
Patented Jan. 2, 1968

3,361,881
FLUID POWER CONTROL SYSTEM
AND COMPONENTS
William J. De Gain, 4228 Phillip,
Detroit, Mich. 48204
Filed Dec. 9, 1965, Ser. No. 517,172
15 Claims. (Cl. 200—81.4)

ABSTRACT OF THE DISCLOSURE

A fluid power control system having an air probe connected between a sink and source, a signal device connected in a line between the source and the probe, said signal device having a spool moveable between two positions in accordance with the two positions of the probe; and a limit switch actuated upon movement of said spool coinciding with the abnormal position of said probe.

---

This invention relates to a fluid powered system for controlling and monitoring the operation of machines and to components useful in such a system.

Machines which automatically perform a series of diverse or repetitive operations must be equipped with control systems for monitoring the successful performance of a particular step or operation so as to initiate the successive operation and/or terminate the operation of a machine after a malfunction to prevent further malfunctions or machine breakdown. Machines which are electrically energized normally employ electric control elements for this purpose. For example, in an electrically actuated press that repetitively stamps holes in parts fed to it, limit switches will be provided to insure that one part has been removed from the stamping position before a second part is fed; to insure that a new part is in position before the press ram is actuated downwardly; and to insure that a hole has been formed in that part and the press punch is in proper position before the next sequence will be actuated. In order to assure the proper operation of the limit switches, they must be operated in a positive manner at each test so that an electrical signal may be derived from them. The absence of a signal might signify the improper operation of a limit switch as well as the proper occurrence of an operation. A typical limit switch will be actuated at least once and often several times during a machine cycle. The state of the limit switch art is such that the maximum life expectancy of a limit switch which carries a normal signal type current may not exceed one million cycles. When several limit switches are used in connection with a machine control, the limit switches become the greatest source of failure and extensive research has been performed in the last few years in an attempt to correct this problem.

As a solution, the present invention contemplates a control system which employs limit switches as actuating elements but not as active probing elements. The present invention provides a fluid power system, which normally utilizes air pressure, operative to sense the condition of the various machine elements and workpieces and to actuate a limit switch only upon the occurrence of an abnormal situation. While the probing and signal elements used in connection with the present invention may or may not undergo a mechanical movement each time a particular operation is sensed, they never perform the switching of electrical currents, therefore it then may be easily designed to achieve a life expectancy of many million cycles.

A broad conception of the present invention, as will be disclosed in the following detailed description and several preferred embodiments of the invention, incorporates a probe device operative to sense the condition of a machine or part. The probe has an air inlet from a source at a first pressure level and an outlet to a second, lower pressure sink, which is normally the atmosphere. The probe has a first state wherein its air input is connected to the sink, and a second state wherein the air input is blocked from the sink. One of these states corresponds to a normal condition of the machine or part and the other state corresponds to an abnormal condition. The fluid pressure for the inlet to the probe is supplied by some device such as an air compressor. A signal device is disposed in the line between the pressure source and the probe and operates in accordance with the condition of the probe as it affects the pressure in the line. The signal device has a spool movable within a housing and the spool is acted upon by the air in the line so as to assume one of two positions, depending upon the status of the probe. The spool has a section which may extend out of the housing and when the probe is in its abnormal state, the air pressure acts on the spool so as to extend the spool section beyond the housing. A limit switch is associated with one or more signal devices and the extension of a spool to an abnormal state actuates the limit switch. The broad invention lies in this system and in the special construction of the signal device and the probe. As will be noted in connection with the detailed description of various embodiments of the invention, a plurality of species of this generic invention relate to various probe and signal device constructions and various manners of combining these units with limit switches to achieve a highly flexible and versatile system based upon a few central components.

Since almost all of the limit switches employed in normal control systems act to terminate or suspend the normal operation of the machine upon the detection of a faulty operation, the present invention may utilize a number of probes and associated signal elements in connection with a single limit switch. Upon the occurence of a fault, a signal device will actuate the limit switch, terminating the operation and one of the signal devices will be put into such a mechanical condition as to indicate the source of error in a machine. One probe and a companion signal device will normally be associated with each machine operation which is to be sensed and the probe and the signal device may be extremely simple and low in cost so that the system formed in accordance with the present invention provides extensive savings over normal systems which employ one limit switch for each operation.

The probes which form part of the present invention are capable of switching from a normal to an abnormal condition with a minimal input actuation. For example, one probe takes the form of a piston movable in a cylinder. A connection to the air sink is made in the wall of the cylinder and air from the source is admitted to the cylinder behind the piston. A motion of the piston of as little as .005 inch is sufficient to move the piston within the cylinder so as to block or unblock the connection to the sink. The slight motion is sufficient to control the position of the spool of the signal device so as to actuate an associated limit switch. In this manner the system acts as an amplifier in that it produces the relatively long motion necessary to actuate a normal limit switch based upon relatively small motion of the machine piston. The probes may be extremely simple in construction and in one embodiment of the invention take the form of blocks having small holes in their surface which connect a pressure source to the atmosphere. The presence or absence of a part over the hole will control the air flow therethrough and thereby control the position of the spool of the associated signal device. Part sizes and positions may be controlled by using probes containing sets of spaced holes. Each of the holes may control a separate limit switch through an associated signal device in order to provide a positioning system.

The simple form of the probe allows it to assume a variety of physical configurations in accordance with the demands of a particular application.

As has been noted, the signal devices used in connection with the present invention basically take the form of a housing having a passage connecting the air source to a probe and having a movable spool which senses the condition of the air in the housing. A mechanical connection is made between the spool and a stem which extends out of the housing and which may be used to actuate a limit switch upon movement of the spool. A preferred embodiment of the signal device is so designed that air passing from the source to the probe acts upon the spool in a differential manner. In the normal condition of the spool, forces are exerted upon it in both directions, but the balance of forces is such as to maintain it in a normal position. When the condition of the probe changes so as to change the flow in the line, this differential balance changes so as to move the spool into an abnormal condition. This design is such that the spool movement is practically instantaneous.

The actuation of the signal device spool by differential pressure forces rather than air acting against a spring, insures a constant and positive spool motion, independent of variations in the spring length or spring force.

One embodiment of the invention takes the form of an integral probe and signal device. The cylinder for a piston type probe is formed directly in the signal device housing. A slight movement of the piston blocks at atmospheric vent and thereby triggers a more extensive movement of the signal device spool to actuate a limit switch.

In another embodiment of the invention an on-off air supply valve is disposed in the supply line to the signal device and probe. This on-off valve is itself equipped with a probe which senses the status of the machine so as to turn on the air supply to the subsequent elements only at such time as the status of the part associated with the first probe is to be monitored. This technique is economical of electrical circuitry which would otherwise be needed to energize the limit switch at the appropriate time.

The following detailed description discloses a variety of signal devices which may be actuated by either the stopping or starting of air flow and which may be automatically resetting or requiring manual resetting.

It is therefore seen to be a primary object of the present invention to provide a system including an air probe connected to a sink and source which may assume two states, so as to either connect or disconnect said source from said sink; a signal device connected in a line between the source and the probe and having a spool movable between two states in accordance with the condition of the probe, said spool having an extension out of the valve housing; and a limit switch connected so as to control machine operation and operative to be actuated by the movement of the spool into a position coinciding with the abnormal condition of the probe.

Another object is to provide such a signal device which may be disposed in a line between a source of pressure and an air probe for sensing two operation positions which coincide with various conditions of the probe; and includes a member, actuated by a valve spool, and extending out from the valve housing which may be utilized in actuating limit switches.

Another object is to provide a variety of signal devices and probe constructions, and systems which may be formed from these signal devices and probe constructions so as to form various species of the above inventions.

Other objects, advantages and applications of the present invention may be made apparent by the following detailed description of a variety of preferred embodiments of the invention. The descriptions make reference to the accompanying drawings in which:

FIGURE 1 is a drawing of a control system for use on a machine to determine the formation of a hole in a part of the machine, partly in schematic form, and partly in section to show details of the components;

FIGURE 2 is a drawing of the system of FIGURE 1 showing a signal device and probe in section as the system senses a part having a normal hole;

FIGURE 3 is a drawing of the system of FIGURE 1, in section, showing the detection of a part with an improperly formed hole;

FIGURE 4 is an elevation view of a system representing a second embodiment of the invention and having a pair of probes and a pair of signal devices actuating a single limit switch, shown partly in section;

FIGURE 5 is a plan view of the signal devices of the embodiment of FIGURE 4;

FIGURES 6, 7, and 8 are sectional views through one of the signal devices of the embodiment of FIGURE 4 showing it in its various conditions of operation;

FIGURE 9 is a schematic diagram of a system representing a third embodiment of the invention, with the probe shown in section;

FIGURE 10 is a drawing of a system representing a fourth embodiment of the invention with the units shown in section; and FIGURE 11 is a sectional view of a combination probe and signal device which represents a fifth embodiment of my invention.

All of the preferred embodiments of the invention which will be disclosed in detail are powered by compressed air. It should be recognized that other fluid mediums may be used in connection with this system when their engineering characteristics are required. For example when rapid response over long power lines is required an incompressible oil might be employed.

The embodiment disclosed in FIGURE 1, 2, and 3 is powered by an air compressor 20 through an air line 22. The line connects to one end of an inlet port 24 that is formed through the width of a signal device housing 26. The opposite end of the inlet port 24 is stopped by a plug 28. The port si formed entirely through the width of the housing 26 so that a plurality of housings may be stacked together and powered by a single air line. With that purpose in mind, a pair of bolt holes 39 pass through the width of the housing at its upper and lower sides.

A channel 32 connects the inlet port 24 with a widened bore 34 formed in a central cylindrical chamber 36 within the housing 26. The chamber 36 communicates to the exterior of the housing 26 through a narrowed section 38 which is formed by an inserted section disposed within the bore 34.

A spool 40 having a basic outer diameter equal to the bore of the cylindrical chamber 36 is disposed within the chamber. One end is formed with a truncated conical section 42 while the other end is formed with a first narrowed section 44 and an elongated stem 46 of a still smaller diameter. The section 44 and the stem 46 are joined by a small step 45 of an intermediate diameter. The stem 46 has a diameter equal to the opening in the narrowed section 38 and extends through the section; their mating surfaces acting as an air seal. The combined lengths of the sections 40 and 44 of the spool are slightly shorter than the chamber 36 and the spool is capable of sliding within the chamber so as to move between the forward right position, shown in FIGURE 2, wherein the forward edge of the step abuts the narrowed section 38 of the housing, and the extreme left position shown in FIGURE 3, wherein the end of the truncated conical section 42 abuts the opposite end of the chamber 36.

An outlet channel 48 formed in the housing 26 connects the lower end of the widened chamber section 34 to an outlet port 50. This outlet channel 48 passes to the rear of the chamber 36 and communicates with the upper end of the probe housing 54 which is used to sense the condition of a machine part by means of a fluid line 53.

The probe housing 54 is cylindrical in shape and has a central chamber 56 which carries a piston 58. The piston is attached to a probe stem 60 which passes through and is journaled in a narrowed bore 62 of the housing 54. The chamber 56 vents to the atmosphere through a passage 64 formed through the shoulder between the chamber 56 and the bore 62. On O-ring 66 of a flexible material such as rubber is set in the corner of this shoulder with the bore 62 acting as a journal and guide for the stem. The piston 58 and stem 60 are movable within the chamber 56.

The fit between the piston 58 and the wall of the chamber 56 is a loose one so that air entering the chamber 56 from line 53 may normally pass about the edges of the piston 58 and out the vent passage 64 to atmosphere. However, when the piston 58 and stem 60 are in their lowermost position in the chamber 56, the piston rests on the O-ring 66 forming a seal therewith which blocks the passage of air through the vent passage 64. As long as air pressure is maintained in the chamber 56 the piston 58 is normally driven to this position wherein it blocks the passage of the air into the vent 64.

The probe stem 60 is employed to sense the absence or presence of a particular mechanical condition in a machine or a workpiece operated on by the machine. For example, a workpiece 68 should be formed with a central hole 71. The probe housing 54 may be fixed with respect to a machine and a part 68 may be moved upwardly with respect to the probe so that the stem 60 will pass through the central hole 71 in the workpiece. Alternately, the workpiece 68 may be maintained in a fixed position and suitable means such as a pneumatic ram (not shown) may be employed to bring the probe downwardly so as to sense the hole 71. If the hole 71 is formed in the workpiece 68 the piston 58 is not forced into the chamber 56 but maintains its position against the O-ring 66 wherein it blocks passage of air through the vent 64. However, if the hole 71 is imperfectly formed in the workpiece 68 or not formed at all, the stem 60 and the piston 58 may be forced upwardly into the probe chamber 56 as shown in FIGURE 3. In that position, air from line 53 may pass around the sides of the piston 58 and out of the vent 64.

The signal device 26 is designed to pass air from the compressor 20 to the probe housing 54 and to sense whether or not the air pressure is being vented to the atmosphere through the passage 64 in the probe, or is being blocked from the atmosphere.

The signal device 26 is shown to be associated with a limit switch 70 which senses the position of the spool stem 46. When the spool is to the extreme right, or forward position in the chamber 36, as shown in FIGURE 2, the stem 46 abuts the limit switch and actuates it to its first position. When the spool 40 moves to the left position, as shown in FIGURE 3, the stem 46 no longer abuts the limit switch and the limit switch is actuated to another position. This change in the condition of the limit switch is used to control the operation of the machine.

The right position of the spool as shown in FIGURE 2 coincides with the normal, sealed position of the probe stem 60 as shown in that figure. In that position a connection is made from the line 22 through the port 24 into the chamber bore 34 and around the spool section 40 through the outlet channel 48 to the output line 53. As the passage of air through the probe vent passage 64 is blocked, full air pressure is exerted against the truncated cone 42 which forms the left end of the spool 40 so as to urge the spool 40 to the right. Full air pressure is also exerted on the shoulder formed between the narrowed section 44 and the intermediate step 45. This pressure urges the spool 40 in a left direction. Since the area of the truncated cone 42 is equal to the full diameter of the spool and the area urging motion to the left only represents the partial diameter, a differential force is exerted on the spool maintaining it in its right position.

When the probe stem 60 detects an imperfect hole in the workpiece 68, the stem is lifted within the probe housing 54 in the manner illustrated in FIGURE 3. Air may then pass around the sides of the piston 58 and out through the passage 64. This produces a flow of air through the outlet channel 48 of the signal device. This greatly reduces the pressure acting upon the truncated conical end 42 of the spool 40 and urging the spool toward the right position in the signal device housing 26. However, full pressure is still maintained on the right side of the spool, urging the spool toward movement to the left. The differential in force created is such that the spool moves to the left, as indicated in FIGURE 3 until the conical end 42 abuts the end of the chamber 36. During this motion the spool stem 46 is moved out of contact with the limit switch 70. This signals an associated electrical control system that a malfunction has occurred. The control system (not shown) is designed so as to accept the signal and utilize the information in an appropriate manner, such as terminating the operation of a machine and sounding an alarm.

When the improper condition has been corrected so that the valve stem 60 moves down to the seat on the O-ring 66 as a result of the air pressure against the piston 58, flow is again blocked by the probe and the initial pressure condition resumes so that the spool moves to the right position, again setting the limit switch.

It should be understood that the probe might be used to sense the proper operation of a machine part rather than an abnormal condition so that the limit switch 70 could be used within the control system for sequencing purposes. Similarly, the probe might be used so that the normal presence of a machine part lifts the piston 58 so as to allow free air flow through the probe. The left position of the spool 40 within the signal device housing 26 would then constitute a normal condition which would be reversed if the probe stem 60 were allowed to close off the flow through the probe.

The embodiment of the invention disclosed in FIGURES 4–8 operates in connection with probes which normally vent air to the atmosphere but which block the passage of air to the atmosphere upon the sensing of an abnormal condition. Two varieties of such probes are disclosed, each having an associated signal device, which pair of signal devices are connected so as to actuate a single limit switch.

One of the probes used in connection with the second embodiment of the invention, generally indicated at 80, is formed of a cylindrical housing 82 having an internal cylindrical chamber 84 and an inlet port 86 connecting to the chamber 84 at its upper end. A fluid line 88 makes connection to the port 86 and supplies the chamber with pressurized air.

A piston 90 is disposed within the chamber 84 and makes a sliding fit therewith. The piston is attached to a probe stem 92 which passes through a bore 94 formed in the housing 82 below the chamber. This bore 94 acts as a journal and guide for the stem which is capable of axial movement with respect thereto. An exit orifice vent 96 is formed in the wall of the housing 82 just above the position assumed by the piston 90 when it is in its lowermost disposition within the chamber 84. When the piston is in this position, air entering the chamber 84 from the port 86 passes out through the vent orifice 96 to the atmosphere.

When the stem hits a part it causes the piston 90 to rise and cover the vent 96, blocking passage of air from the probe. This probe is used in a manner similar to the probe 54 to detect the absence or presence of a hole 98 in a workpiece 100 or in a similar manner, the position of a machine part. It differs from the probe 54 in that in its normal condition air is passed to the atmosphere and in its abnormal condition the passage of the air to the atmosphere is blocked.

Another probe 102 which may be used in connection with the probe 80 on other applications simply comprises a metal block having a central hole 104 formed therein. A fluid line 106 connects to the one end of the bore and the other end of the bore 104 vents directly to atmosphere. Probe 102 may be used to detect a hole or the position of a workpiece indicated at 108. The open end of the probe 102 is brought into abutment with the workpiece 108 and if a hole is present, air from the line 106 is vented into the atmosphere. If no hole is present, the workpiece 108 blocks the end of the probe 102 and prevents the venting of the air pressure to atmosphere.

The probes 80 and 102 are each connected to signal devices generally indicated at 110. The two signal devices illustrated are identical and identical numerals will be used to refer to them. The signal devices are formed with rectangular housings 112 which have mounting holes 114 formed through their thicknesses. Bolts 116 pass through both signal device housings and fastens with nuts 118 at the opposite end so as to support the housings with their sides abutting one another.

An air line 120 connects both signal device 110 to an air compressor 122. The line 120 connects to an inlet port 124 which passes through both housings and is plugged at its extreme end. Channels 126 in each signal device connect the inlet ports 124 with widened bores 128 formed in central cylindrical chambers 130. The chamber 130 of each signal device communicates to the exterior of the housing 112 through a narrowed section 132 which is formed by an inserted section disposed within the bore 130.

A spool 134 is disposed within the chamber 130. The spool 134 has a central section 136 having an outer diameter equal to the bore of the chamber 130, joined to an end section 138 of the same diameter by a smaller diameter neck 140. The end of the section 138 is formed in a truncated conical shape 142. The central section 136 carries a steam end 144 which extends through the bore and the narrowed section 132 to project out of the housing.

The spool is completed by an interior passage 146 which connects the shoulder between the stem 144 and the central section 136 with the shoulder formed between the neck 140 and the central section 136.

The spool 134 may move within the chamber 130 between an extreme left position, illustrated in FIGURE 6, wherein the truncated conical end 142 abuts the extreme left wall of the chamber, and an extreme right position, illustrated in FIGURE 8, wherein the shoulder between the central spool section 136 and the stem section 144 abuts the interior edge of the narrowed section 132. FIGURE 7 illustrates an intermediate position of the spool.

An outlet passage 148 connects the enlarged bore 128 with an outlet port 150. The outlet port 150 of one of the signal devices 110 connects to the line 88 to the probe 80 while the outlet port 150 of the other signal device connects the line 106 to power the probe 102. A passage 152 connects the outlet passage 148 to the extreme left end of the central chamber 130.

The signal devices are completed by a vent passage 153 which connects the chamber 130, at a point covered by the central spool section 136, when it is in its left position, to the atmosphere.

A single limit switch 156 is used in conjunction with both of the signal devices 110. A rod 158 is journaled in a groove 160 formed across the top of the thickness of the signal devices 110. The rod 158 is free to rotate in the groove 160 and is retained therein by cover plates 162. The rod 158 has an end section 160 which is bent at 90° with respect thereto, and lies over the actuation button 163 of the limit switch 156. Along its length the rod 158 also carries a pair of bars 164 which depend downwardly therefrom so as to extend over the spool stems 144 of the two signal devices 110. The arrangement is such that when both of the spools 134 are in their left, or normal positions, the rod section 160 hangs down in front of the button 163 of the limit switch 156 and does not actuate the limit switch. When either of the spools 134 move to the right so as to extend its stem 144 the associated rod 164 is pivoted causing the rod 158 to pivot and causing the section 160 to move toward the button 163 of the limit switch. This actuates the limit switch and sends a signal to the associated controls.

The spools 134 are in their left positions as shown in FIGURE 6, when their associated probes 80 and 102 are in their normal condition of venting air to the atmosphere. When in this condition air from the line 120 passes through the inlet port 124, down the passage 126 and through the widened bore 128 to the outlet passage 148. The passage of air through line 148 produces a Venturi effect in the line 152 so as to create a partial vacuum with respect to the line pressure in the extreme left section of the chamber 130. The normal air pressure in the widened bore 128 exerts a force on the shoulder formed between the spool central section 136 and the stem 144 which has a tendency to move the spool to the left. The passage 146 acts to pressurize the area around the neck 140 but this exerts no net force on the spool because of the equal areas of the shoulder surrounding the neck. The pressure in the widened bore 128 is greater than the pressure surrounding the truncated conical end 142 of the spool because of the Venturi effect acting on the latter surface. Although the area of the truncated cone exposed to pressure is greater than the area of the shoulder between the central section 136 and the stem 144, the differential of forces causes the spool 134 to remain in its left or normal position.

FIGURE 7 illustrates the start of motion of the spool 134 toward the right as an associated probe detects an abnormal condition and prevents air from venting to the atmosphere. First, the flow to the probe terminates and the chamber surrounding the conical end section 142 immediately becomes subjected to the pressure of the compressor. Since the area of the truncated conical section 142 exposed to this pressure is greater than the area of the shoulder between the stem 144 and the central section 136 exposed to the pressure, the differential causes the spool to move to the right to the position shown in FIGURE 7.

At that position the right hand edge of the central section 136 reaches the right hand end of the enlarged bore 128, and the shoulder formed between the central section 136 and the stem 144 is no longer subjected to pressure through the inlet port 124. Simultaneously, the left-hand edge of the central section 136 begins to uncover the end of the atmospheric vent 153. This vents the volume about the neck 140 and communicates atmospheric pressure through the channel 146 to the volume to the right of the spool 136. In the absence of this venting action an air cushion would build up between the right hand end of the central section 136 and the narrowed section 132 which would prevent further movement of the spool to the right. At this point only atmospheric pressure opposes the movement of the valve to the right under the pressure exerted against the conical end 142. The spool rapidly moves to the position illustrated in FIGURE 8.

As the spool moves to the right, its associated rod 164 is tilted upwardly rotating the rod 158 and lifting the rod section 160 off the button 163 of the limit switch 156. This sends a signal to the associated control system which signifies the abnormal condition of one of the probes 80 or 102.

The length of the rods 164 are such that when the spool has reached its extreme right position the end of the rod 164 slides over the top of the associated stem, as seen in FIGURE 8. This prevents the rod 164 from exerting any resetting force on the spool. After the malfunction is corrected and flow vents through the probe which previously blocked the flow, there is no force on the valve 134 which would cause it to move to the left. It must be manually reset. This factor constitutes a safety condition which requires an operator to observe the signal resulting from the malfunction and correct it. He may reset the signalling spool by pushing the stem into the valve housing.

It is contemplated any number of probes and signal devices 110 might be associated with a single limit switch so as to terminate the operation of a machine upon its malfunction.

Another system embodying the concept of the present invention is disclosed in FIGURE 9. This system has as its function to position a part 180 having a central hole 182 with respect to a position sensing probe 184. The probe has a flat surface 186 which is brought into contact with a surface of the part 180. A pair of fluid passages 188 and 190 of the probe vent to the atmosphere at spaced points on the probe surface 186. The spacing between the centers of the vents 188 and 190 is the same as the diameter of the hole 182 in the part and the system positions by moving the part 180 so that the edges of the hole 182 are brought into alignment with the two vent passages 188 and 190.

In order to achieve this, the two passages 188 and 190 are connected by a pair of fluid lines 192 and 194 to a pair of signal devices 196 and 198 respectively. The signal devices are of the type disclosed in FIGURES 4 through 8 wherein an associated limit switch is actuated when the flow through the particular flow vent is blocked. A pair of limit switches 200 and 202 are accordingly associated with the signal devices 196 and 198 respectively. The limit switches 200 and 202 are in one state when their respective vent passages 188 and 190 are blocked by the surface of the part 180 and are in the other condition when the passages are unblocked.

Each of the limit switches 200 and 202 makes connection to a control system 204. The control system provides power to a linear actuator 206 which has its rod 208 attached to the part 180.

The arrangement of the system is such that only one of the two vent passages 188 and 190 will be blocked at a given time, the other being disposed over the hole 182 formed in the part 180. Appropriate restraints (not shown) are placed on the physical devices so as to prevent the part 180 from moving with respect to the probe 184 so that both of the vent openings are blocked. At such time as one of the vent openings is blocked, its associated signal device actuates one of the limit switches to send a signal to the control system 204. This signal causes the control system to energize the actuator 206 in such a direction as to move the part 180 to unblock the vent which is blocked. For example, if the left vent 190 became blocked, the resultant actuation of the limit switch 202 by the signal device 198 would operate through the control system 204 so as to cause the actuator to move the part 180 to the left, as seen in FIGURE 9, until the vent 190 became unblocked. The vents 188 and 190 are arranged so that both are unblocked when the part 180 is in the exact position desired.

The system of FIGURE 9 could also be realized with signal devices of the type disclosed in FIGURES 1 through 3 by spacing the vent openings in the probe 184 so that both are blocked by the part 180 when and only when the part is in proper position with respect to the probe. In that case, an unblocked probe vent would energize the actuator so as to move the part in an appropriate direction to block the vent. It should be understood that the part 180 need not be the part that it is actually desired to be positioned, but may be a plate attached thereto so that the motion of the plate follows the motion of the part to be positioned. The probe 184 could be formed in a very miniaturized version if space requirements were critical.

The system of FIGURE 10 is used to replace a pair of limit switches, one of which senses the presence of a part while the other gages a critical dimension of the part. The part to be tested 220 has a circular aperture 222 which is to be gaged to determine if it exceeds a particular diameter. A plug gage 224, designed so as to form a close fit with a hole of the critical diameter, forms the probe end of a probe device generally indicated at 226. The probe is powered by an air supply line 228 which makes one connection through channel 230 to the bottom of a central chamber 232 directly above a piston 234 formed in the end of the probe end 224. The air from the supply line 228 thus acts to force the piston 234 downwardly and to urge the probe end 224 against a workpiece to be checked. The probe stem has a narrowed section 236 which forms a volume that receives air pressure from the passage 238. When the probe end 222 is in proper position so that the narrowed section 236 is opposite the passage 238, air from the passage 238 is vented to the atmosphere through a passage 239.

The probe device 226 receives air from a signal valve 240 which is of the type disclosed in FIGURES 4 through 8. This signal valve is associated with a limit switch 242 which is energized when air passing through the line 228 is blocked from the vent 239. The signal valve receives air from a supply valve generally indicated at 244 via line 246. The supply valve 244 is connected to a compressor 248 by line 250 and is designed to pass air to the signal valve 240 and to the gaging probe 226 only at such time as a part 220 is in a position to be gaged.

The supply valve 244 is constructed with a central housing 254. A cylindrical chamber 256 is centrally formed in the housing 254. A probe stem 258 is disposed in the central chamber 256 and extends outwardly therefrom.

The air supply line 250 enters the supply valve housing 254 through a pair of passages 260 and 262. The passage 260 communicates with the upper end of the chamber 256 and acts to urge a piston 264, formed on the end of the probe stem 258 in a downward direction so as to move the probe stem in a forward position, out of the chamber 256. The passage 262 normally abuts one of the side walls of the stem 258 so as to block air flow. However, when a narrowed section 266 is properly positioned with respect to the termination of the passage 262, air passes out of the housing 254 via another passage 268 which connects to line 246.

In the absence of a part 220, air from the compressor 248 passes to the supply valve 244 via line 250, and pressures the probe 258 downwardly. The probe is then in a position wherein the narrowed section 266 of the probe stem is not in opposition to the passages 262 and 268 and flow out of the line 246 is blocked. In this condition the signal device 240 and the probe 226 are generally inoperative and no signal is provided to the limit switch 242.

When a part 220 is brought into position with respect to the supply valve 244 the probe 258 allows the passage of air between the passages 262 and 268. Air is thus supplied to the signal valve on line 246 and along line 228 to the probe 226. The flow of air into the upper end of the chamber 232, via the passage 230 moves the gaging probe stem 224 downwardly.

If the hole 222 formed in the workpiece 220 has a diameter smaller than the outer diameter of the probe gage 224 the probe will not pass through the hole. This maintains the probe 224 in a position whereby air is vented to the atmosphere via passages 238 and 239 around a narrowed section 236 of the probe stem. In this normal condition the spool of the signal valve 240 does not actuate the limit switch 242. If, however, the hole 222 is formed oversized the probe 224 passes through the hole and passage of air to the atmosphere via the narrowed section of the stem 236 is blocked. This causes the signal valve 240 to shift its spool to the right and actuates the limit switch 242. A trouble signal will then be transmitted to an associated control system (not shown) and suitable action will be taken to correct the situation.

The fluid circuitry of the present invention replaces one limit switch which detects the presence of a part and is necessarily actuated each time a part is in proper position, and another limit switch connected to a probe which senses the diameter of the part and may be actuated each time a part is in position or only at such time as a part with an incorrect diameter is gaged.

FIGURE 11 illustrates a unitary device which incorporates both a sensing probe and a signal device. As disclosed, a part 280 is to be moved into position with respect to a fixed stop 282 and the combination probe-signaling device, generally indicated at 284, is designed to sense the presence of a part 280 at the stop 282 and actuates a limit switch 286.

The device employs a probe stem 288 which has an adjustable end section 290. The length of the end section 290 may be manually adjusted to trim the device to a particular position. The probe stem 288 is movable within a chamber 292 formed in the device's housing 294. A stop 296 limits motion of the stem 288 out of the chamber 292. The signal device is similar to that disclosed in FIGURES 4 through 8 and provides output to the limit switch 286 when the passage of air is blocked. The air is introduced to the housing through an inlet port 298, from which the passage 300 carries air around a widened section 302 in a central chamber 304 and through an outlet passage 305 to the interior end of the chamber 292. The air pressure in the chamber normally forces the probe stem 288 outwardly so that the air may pass through a vent passage 306 to the atmosphere. A spool 308 is maintained in a right hand position as seen in FIGURE 11, by the differential pressure exerted between a shoulder 311 and a truncated conical end 312. A passage 310 is provided to transmit pressure from the central section of the spool to the area of the shoulder 311.

The movement of the part 280 against the stop 282 actuates the stem 288 downwardly so as to block the vent passage 306. The resultant termination of flow through the signal device provides pressure against the conical end 312 of the spool via passage 314 and causes the spool to move to the left in the same manner as do the spools of the signal devices 110 (FIGURES 4 through 8) when air flow is blocked through them. This actuates the limit switch 286 so as to provide a signal to an associated control system.

It has been determined in practice that a motion of the stem 288 of less than .005 inch will provide positive actuation of a normal type limit switch when associated with the device of this type. By coupling the device 284 with an air supply valve of the type shown in FIGURE 10, a wide variety of fluid circuitry combinations may be achieved.

It should be recognized that the above preferred embodiments of various systems and components formed in accordance with the present invention are only illustrative of the forms that the present invention may take. This invention should only be limited by the following claims.

Having thus described my invention, I claim:

1. A control system for a machine comprising:
   (a) a source of fluid power;
   (b) a parts sensing device responsive to an external condition having a passage therethrough operative to receive fluid power from said source, and having a first operative condition wherein said passage is connected to a low pressure sink and a second operative condition wherein said passage is blocked from said low pressure sink;
   (c) a signal device having a cylindrical bore formed therein and a cylindrical spool positioned in said bore and slidable between a first position and a second position, said spool having first sections of a diameter such as to form a sliding fit with said cylindrical bore, and second sections of a smaller diameter,
   (d) fluid connections from said power source to the cylinder bore of said signal device and from said signal device to the passage of the sensing device;
   (e) and electrical switching means responsive to change of position of said spool, whereby the spool of the signal device is normally maintained in a first position as a result of pressure exerted on one of said second sections of smaller diameter of said spool by said power source, as long as said parts sensing device is in one of its two operative conditions, and said spool is moved to its second operative position at such time as said signal device is in its second operative condition, as a result of a change of pressure in the line connecting said signal device to said sensing device.

2. A control system as defined in claim 1, wherein said electrical switching means provides a first electrical signal when said spool is in its first position and a second electrical signal when said spool is in its second position.

3. A control system as defined in claim 2, wherein said spool is disposed in its first position at such time as the sensing device is in its first operative condition and disposed in its second position at such time as the sensing device is in its second operative condition.

4. A control system as defined in claim 1, wherein said signal device spool is disposable in either said first position or said second position depending upon the nature of the fluid flow from the source to the sensing device.

5. A control system as defined in claim 1, wherein said sensing device comprises a probe having an input passage and an output passage, said probe being operative to be disposed in either a first condition wherein said input passage is connected to said output passage or a second condition wherein said input passage is blocked from said output passage depending upon an external condition sensed by the probe; and said signal device comprises a housing having an input passage and an output passage, said bore being formed in said housing and said spool movable in said bore, said signal device input passage and said signal device output passages being connected through said central bore, said input passage connected to said fluid power source and said output passage connected to the input passage of the probe, and said signal device adapted so that the spool is deposited in the first position so that fluid flows between said inlet and outlet passages of said signal device and the second position where no flow occurs through said signal device.

6. A control system as defined in claim 5, including a second signal device comprising a housing having an input passage and an output passage, a central chamber and spool movable in said chamber, between a first position and a second position, said input and said output passages connected through said chamber, said output passage connected to the input passage of the probe and said input passage connected to said fluid power source; said electrical switching means comprises an electrical switch operatively connected to each of said signal devices and responsive to the position of the signal device spools so as to provide a first electrical signal when both of the signal device spools are in the first position and a second electrical signal when either of the signal device spools are in the second position.

7. A control system as recited in claim 1, wherein said sensing device has a second passage; part sensing means associated with each passage and said sensing device having a first operative condition wherein said passages are connected to said low pressure sink and a second operative condition wherein said passages are blocked from said low pressure sink, the condition of each of the passages being determined by the associated part sensing means; and including a second signal device having a spool disposable in a first position or in a second position, said second spool responsive to the operative condition of the associated sensing device; fluid connections from said pressure source to each of said signal devices, and from each of said signal devices to one of the passages of the sensing device; and wherein the electrical switching means comprises electric switches associated with each of the signal devices and operative to sense the position of the spool of the signal device.

8. A control system as recited in claim 2, wherein said sensing device has a second passage therethrough, both of said passages terminating in a common face; and including means for bringing said face of the sensing device into contact with a machine part; a second signal device having a spool disposable in a first position or a second position; fluid connections from said pressure source to said second signal device and from said second signal device to one passage of said sensing device; an electrical switching means responsive to change of position of said second spool; an actuation for said machine part; and a control system operative upon the receipt of signals from said electrical switches to cause said actuator to move said part so as to assume a particular position with respect to the common face of the sensing device.

9. A control system as recited in claim 1, wherein said fluid connection conducts fluid power from said signal device to a first end of the passage in the parts sensing device, and including means for bringing the second end of the passage in the parts sensing device into proximity with a machine part so that fluid will either pass or not pass through said passage depending on the condition of the machine part.

10. A control system as defined in claim 3, wherein said parts sensing device comprises a probe having an input passage an output passage, a chamber connected to said input passage and said output passage; a piston movable in said chamber, a stem connected to the piston and extending out of the chamber, said probe having a first condition wherein said piston blocks the input passage from the output passage and a second condition, wherein said piston does not block the input passage from the output passage, the disposition assumed by said piston being dependent upon the disposition of the stem.

11. A control system as defined in claim 1, wherein said signal device comprises:
 (a) a housing having an input passage from said source of fluid power, an output passage to said parts sensing device, and said bore disposed between said input passage and said output passage; and
 (b) said spool movable within said chamber, said spool disposed in a first position at such time as said signal device is passing fluid from said source to said parts sensing device and in a second position at such time as the signal device is not passing fluid from said source to said parts sensing device, said spool having a stem attached thereto which extends out of said signal device housing at such time as said spool is in one of its two positions, and said electrical switching means disposed so as to be actuated by the stem as the stem extends out of the housing.

12. A signal device for use in a system which includes a source of fluid pressure and a probe having an input passage, an output passage connected to a low pressure sink and operative to be disposed in a first condition wherein said input passage is connected to said output passage or a second condition wherein said input passage is blocked from said output passage, said signal device comprising:
 (a) a housing;
 (b) an input passage in said housing connected to said source of fluid pressure;
 (c) an output passage in said housing connected to said probe;
 (d) a central chamber of a first diameter disposed in said housing;
 (e) a spool disposed in said chamber;
 (f) an enlargement in said chamber connecting the input passage to the output passage;
 (g) a connection between said output passage and one end of the chamber at a point removed from the enlarged section of said chamber; and
 (h) a stem attached to said spool and extending out of said housing; so that when said probe connects its input passage to the low pressure sink, fluid flows through said signal device from said source of pressure to said spool and exerts a force on said spool moving it in a first direction, and when said probe is in its second position so as to block passage of said fluid to said low pressure sink, no flow occurs through said signal device and pressure is exerted from said source on said spool moving it in a second direction.

13. A signal device as recited in claim 12, wherein said spool has a shoulder thereon which experiences the pressure of the fluid in the enlarged section of the chamber. so that when fluid is flowing through said signal device from said pressure source to said probe, a force is exerted against the shoulder to cause said spool to move in a first direction and a lesser pressure is exerted against one end of the spool so as to pressure for movement in the second direction, the balance of forces being such that said spool moves in the first direction, and when flow through the signal device to the probe is blocked, the force tending to move the spool in the second direction is increased so as to cause the spool to move in the second direction.

14. A signal device as defined in claim 13, wherein movement of the spool in the second direction blocks the application of pressure to the shoulder of the spool so that the spool must be moved in the first direction by external means in order to reset it.

15. A signal device as defined in claim 14 wherein a connection is made between the narrowed area of the spool adjacent the shoulder and the atmosphere at such time as the spool moves in the second direction.

References Cited

UNITED STATES PATENTS

| | | | |
|---|---|---|---|
| 1,692,889 | 11/1928 | Dupont | 91—417 |
| 1,964,943 | 7/1934 | Harris | 200—46 |
| 2,499,494 | 3/1944 | Greer | 200—81 |

BERNARD A. GILHEANY, *Primary Examiner.*

H. BROOME, *Assistant Examiner.*